United States Patent [19]
Brown

[11] 3,961,616
[45] June 8, 1976

[54] FUEL VAPORIZER FOR ENGINES

[76] Inventor: George A. Brown, 310 S. Highway 288, Clute, Tex. 77531

[22] Filed: Dec. 31, 1974

[21] Appl. No.: 537,661

[52] U.S. Cl. .................. 123/122 A; 123/119 A; 123/119 B
[51] Int. Cl.² ........................................ F02M 31/00
[58] Field of Search............ 123/133, 122 A, 119 A, 123/119 B, 122 AC, 122 R

[56] References Cited
UNITED STATES PATENTS

| | | | |
|---|---|---|---|
| 2,254,775 | 9/1941 | De Hetre | 123/122 A |
| 3,512,509 | 5/1970 | Dargh | 123/119 A |
| 3,633,553 | 1/1972 | Holzapfel | 123/119 A |
| 3,667,436 | 6/1972 | Reichhelm | 123/119 A |
| 3,846,980 | 11/1974 | De Palma | 123/119 B |

FOREIGN PATENTS OR APPLICATIONS

| | | | |
|---|---|---|---|
| 658,433 | 2/1963 | Canada | 123/122 A |
| 1,110,524 | 9/1954 | France | 123/122 A |
| 482,981 | 9/1929 | Germany | 123/122 A |

*Primary Examiner*—Charles J. Myhre
*Assistant Examiner*—R. H. Lazarus
*Attorney, Agent, or Firm*—Clarence A. O'Brien; Harvey B. Jacobson

[57] ABSTRACT

An approximately 1 inch thick plate, 4 or 5 inches square, having a plurality of 1/16 inch perforations drilled through the 1 inch thickness and extending over approximately half of the central square area of the plate, and with exhaust gas passages surrounding the drilled hole area, is inserted in the flow path of the fuel and air mixture from the carburetor to the intake manifold of an engine. An exhaust gas supply line leads from the exhaust manifold of an engine, to the plate, and from the plate downstream to a further exhaust gas outlet in the form of a coupling with the PCV line which communicates with the carburetor in a conventional manner. In operation, this vaporizes the fuel as it passes through the plate.

4 Claims, 3 Drawing Figures

FUEL VAPORIZER FOR ENGINES

BACKGROUND OF THE INVENTION

The following prior U.S. patents are believed to be indicative of past efforts in this field of endeavor. The Stokes and Fisher (U.S. Pat. No. 1,954,461, issued Apr. 10, 1934, and No. 3,797,468, issued Mar. 19, 1974), patents disclose, respectively, fluid-heat-exchanger tubes between a carburetor and an intake manifold; the Silverstein (U.S. Pat. No. 2,179,235, issued Nov. 7, 1939) patent discloses using exhaust gases to heat an air-fuel mixture; the Christian (U.S. Pat. No. 3,042,016, issued July 3, 1962) patent discloses small pipes surrounded by a heavy metal container heated by the exhaust manifold; the Terao (U.S. Pat. No. 3,107,660, issued Oct. 22, 1963) patent discloses a plurality of perforated walls and passages made of high heat conductive materials; and, the Dillow (U.S. Pat. No. 3,780,714, issued Dec. 25, 1973) patent disclosing tubing wholly housed within an engine manifold.

SUMMARY OF THE INVENTION

Among the objects and advantages of my invention are the following:

1. To provide a fuel vaporizer readily formed of available heat conductive metals.
2. To provide means of easily inserting my device into the various supply and exhaust lines of existing engines.
3. To provide a thick plate with a plurality of small perforations through the center portion of the large square area of the plate, and a diamond-shaped set of passageways in the thickness area of the plate with appropriate entrance and exit connections on opposite sides.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
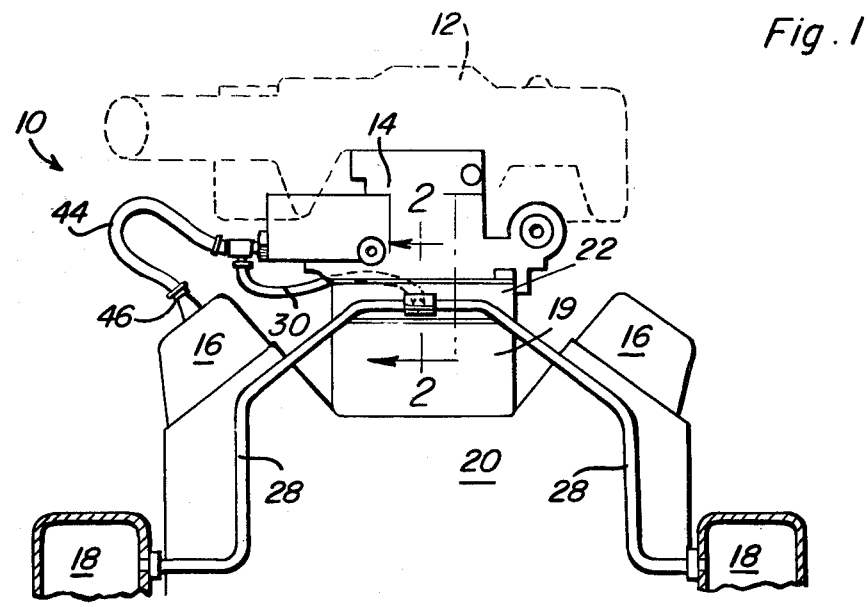
FIG. 1 is an end view of a typical V-type engine having my device attached thereto, part schematic and part in phantom.
Figure 2:
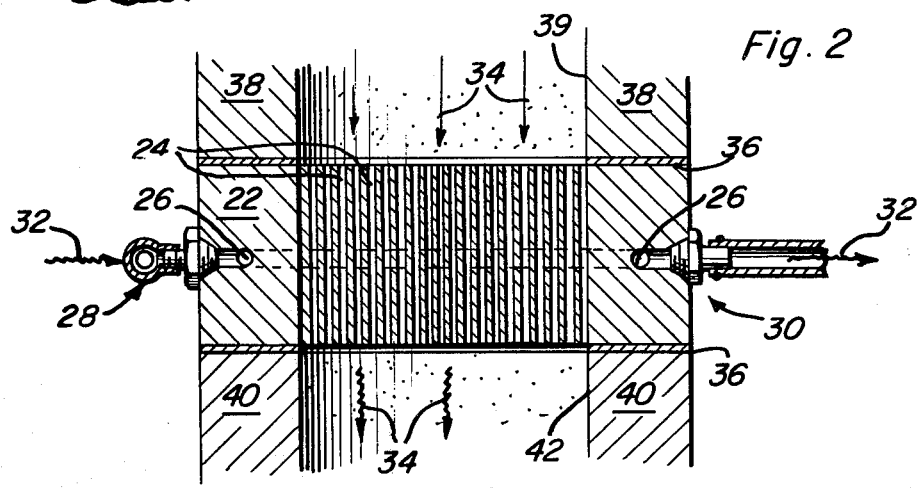
FIG. 2 is a cross-sectional view, on an enlarged scale, taken approximately along the line 2—2 of FIG. 1.
Figure 3:
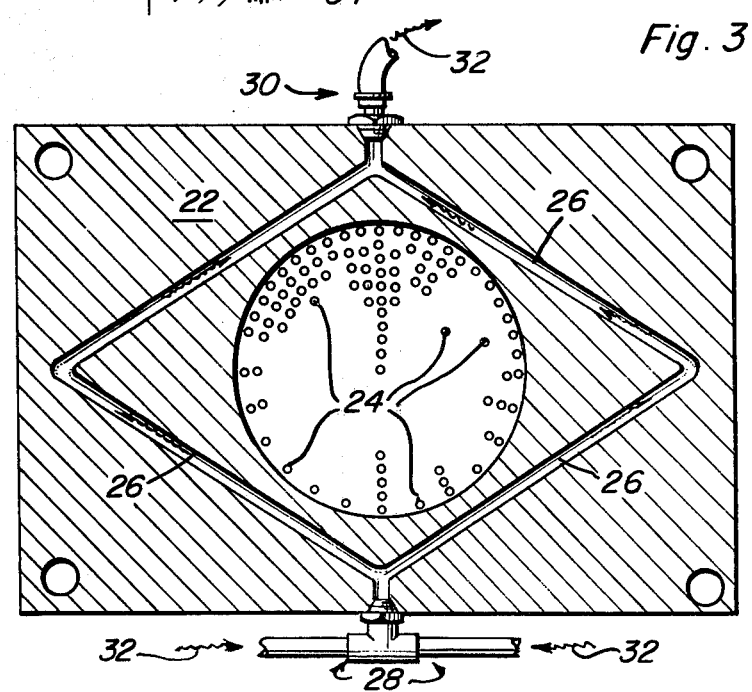
FIG. 3 is a similarly enlarged cross-sectional view taken through the thickness dimension of my plate.

A conventional automotive V-type internal combustion engine is shown with my fuel vaporizer connected thereto, generally schematically, and the entie combination is denoted by reference numeral 10. A typical air cleaner 12 is shown in phantom, above the carburetor 14. Two intake manifolds of a V-type internal combustion engine are shown at 16—16, two exhaust manifolds at 18—18, and an intake manifold 19 mounted on the engine block 20 all of which are conventional.

The fuel vaporizer includes a plate 22 which may be approximately 1 inch (2½ centimeters) in thickness and has a length of approximately 3 to 4 inches (7 to 10 centimeters) on each side (9 to 16 square inches, or 50 to 100 square centimeters). Plate 22 has a plurality of apertures 24 (1/16 inch in diameter or 0.15 centimeters in diameter) drilled through the thickness dimension thereof. Plate 22 further has a generally diamond-shaped, or rhombic, arrangement of exhaust gas passageways at 26. These passages may be "cast," as illustrated; or, they could be bored and plugged to form similar passageways. Intake pipe and coupling arrangements are shown at 28 and the discharge coupling and piping at 30, with arrows 32 showing the directions of the flow of exhaust gases therethrough. Arrows 34 indicate the flow of the fuel mixture through the block 22. Gasket means 36—36 serve as insulation means, prevent vapor locking of carburetor 14, and are used to retain the flow of the fuel mixture (arrows 34) through block 22 when it is inserted between the base of the carburetor 14 and the intake manifold 19. By way of example, 38 represents a part of the base of the carburetor 14, and 40 represents part of the intake manifold 19 with the barrel 39 of the carburetor being aligned with a passageway 42 in the intake manifold 19 with this structure being varied to adapt to multi-barrel carburetors and manifolds with multi-passageways.

The intake pipes 28 are connected with the exhaust manifolds and the discharge pipe 30 is connected into the conduit 44 which interconnects the positive crankcase ventilation (PCV) assembly 46 and the carburetor so that the vacuum in this conduit will assure circulation of exhaust gases through passageways 26 thereby heating plate 22 so that the fuel and air mixture passing through the perforations 24 will be heated and vaporized for more complete burning in the combustion chamber. The shape and size of the plate 22 will vary for different installations and the same hold-down bolts or cap screws will hold the plate in position with such bolts being of appropriate length.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a fuel vaporizing device for an internal combustion engine having a carburetor with fuel and air mixture feed and supply means, engine block, and exhaust gas system, the combination of a heavy, thick plate means having perforations and passageways extending over substantially the central area of said plate, said perforations being drilled through a central circular portion of said plate, said passageways being formed within the thickness dimension, in a generally diamond-shaped, or rhombic, pattern around said perforations, gasket means sealing the central perforated area to means connecting said perforated area within the fuel and air mixture supply means, said passageways in said plate communicating with the periphery of the plate at opposite sides thereof with conduit means communicating the passageways at one side of the plate with the exhaust manifold, and conduit means communicating the passageways at the opposite side of the plate with the carburetor whereby reduced pressure in the carburetor will induce flow of exhaust gases through the passageways in the plate to utilize the waste heat of the exhaust gases to vaporize the fuel enroute to the engine.

2. The combination of claim 1 wherein said conduit means communicating with the carburetor includes a coupling into the positive crankcase ventilation line communicating with the carburetor.

3. The device of claim 2 wherein said thickness dimension of said plate is approximately 1 inch, or 2½ centimeters.

4. The device of claim 3, wherein the square area of said plate is approximately 9 to 16 square inches, or 50 to 100 square centimeters.

* * * * *